US012589567B2

(12) United States Patent
Hanafusa

(10) Patent No.: US 12,589,567 B2
(45) Date of Patent: Mar. 31, 2026

(54) GREEN TIRE MANUFACTURING METHOD AND GREEN TIRE MANUFACTURING APPARATUS

(71) Applicant: Toyo Tire Corporation, Itami (JP)

(72) Inventor: Kazuma Hanafusa, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 179 days.

(21) Appl. No.: 18/228,073

(22) Filed: Jul. 31, 2023

(65) Prior Publication Data

US 2024/0092045 A1 Mar. 21, 2024

(30) Foreign Application Priority Data

Sep. 16, 2022 (JP) ................................. 2022-148066

(51) Int. Cl.
*B29D 30/30* (2006.01)
*B29D 30/00* (2006.01)
(52) U.S. Cl.
CPC ............ *B29D 30/30* (2013.01); *B29D 30/005* (2013.01)
(58) Field of Classification Search
CPC .... B29D 2030/4487; B29D 2030/3078; B29D 2030/0038

USPC ....................................................... 156/130.7
See application file for complete search history.

(56) References Cited

U.S. PATENT DOCUMENTS

| | | | | |
|---|---|---|---|---|
| 2002/0153083 A1* | 10/2002 | Takagi | ............... | B29D 30/3028 156/123 |
| 2009/0133808 A1 | 5/2009 | Tatara et al. | | |
| 2010/0212812 A1* | 8/2010 | Ogawa | .................... | B29C 48/08 156/123 |
| 2021/0370627 A1* | 12/2021 | De Graaf | ............... | B29D 30/30 |

FOREIGN PATENT DOCUMENTS

WO 2006/048924 A1 5/2006

* cited by examiner

*Primary Examiner* — Sedef E Paquette
*Assistant Examiner* — Alexander D Booth
(74) *Attorney, Agent, or Firm* — WHDA, LLP

(57) ABSTRACT

A green tire manufacturing method according to an embodiment includes molding a combined body by attaching a belt band to an outer circumferential surface of a carcass band substantially expanded into a tire shape at a combined body molding position, pressing a surface of the combined body, moving the combined body from the combined body molding position to a sidewall molding position, and molding a sidewall on a side surface of the combined body at the sidewall molding position to form a green tire.

3 Claims, 16 Drawing Sheets

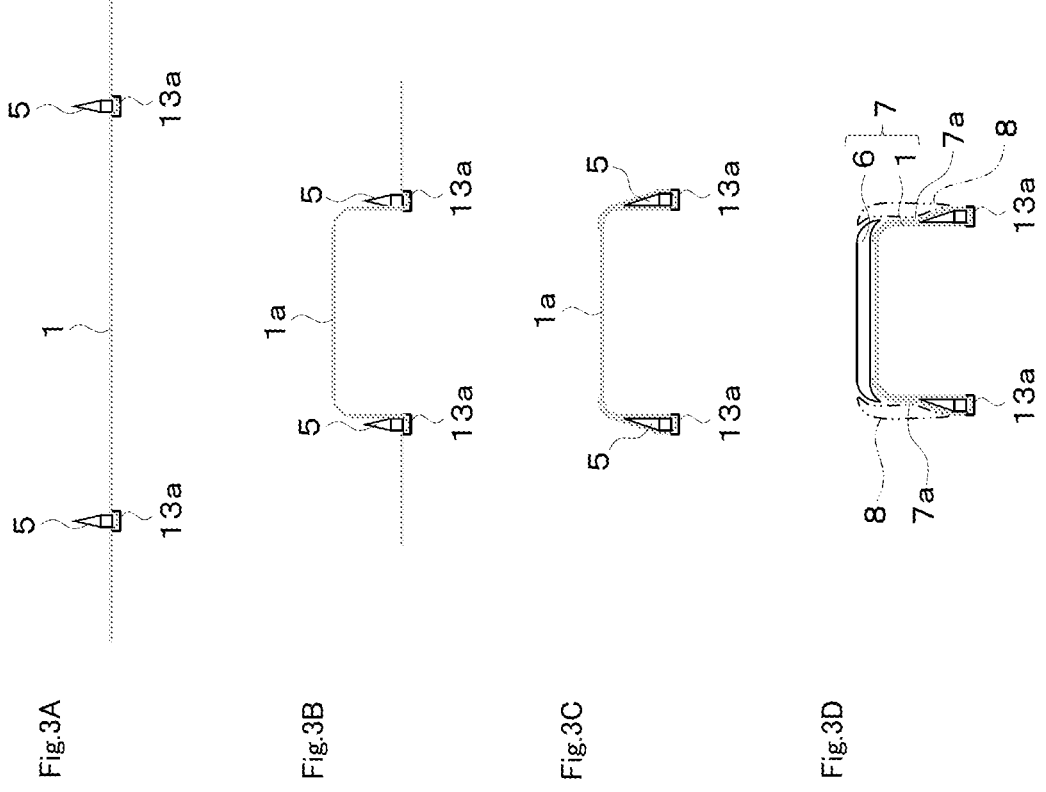

26

CONTROL UNIT

CARCASS BAND DRUM MOVING DEVICE 31

BELT BAND DRUM MOVING DEVICE 32

SHAPING DRUM MOVING DEVICE 33

SIDEWALL DRUM MOVING DEVICE 34

CARCASS BAND TRANSFER 15

BELT BAND TRANSFER 16

GREEN TIRE TRANSFER 17

SIDEWALL RUBBER SUPPLY DEVICE 18

STITCHER 19

CARCASS BAND DRUM 11

BELT BAND DRUM 12

SHAPING DRUM 13

SIDEWALL DRUM 14

GREEN TIRE MANUFACTURING METHOD AND GREEN TIRE MANUFACTURING APPARATUS

CROSS-REFERENCE TO RELATED APPLICATIONS

This application claims the benefit of and priority to Japanese Patent Application No. 2022-148066 filed on Sep. 16, 2022, and the content thereof is incorporated herein by reference in its entirety.

BACKGROUND OF THE INVENTION

1. Field of the Invention

The present invention relates to a green tire manufacturing method and a green tire manufacturing apparatus.

2. Description of Related Art

As described in WO2006/048924, in manufacturing steps of a pneumatic tire, a carcass band in which a carcass ply and the like are laminated and a belt band in which a belt and the like are laminated are separately molded. Then, a combined body is manufactured by attaching the belt band to the carcass band on a drum at a molding position. Thereafter, a sidewall rubber is attached to the combined body on the same drum at the same molding position when the combined body is manufactured.

A green tire is obtained by attaching the sidewall rubber to the combined body. When the green tire is vulcanized, a pneumatic tire is obtained.

SUMMARY OF THE INVENTION

When the green tire is actually produced, the carcass band and the belt band are successively molded. However, since the molding position is not empty until the attachment of the sidewall rubber to the combined body is completed, a subsequent carcass band and a subsequent belt band cannot be moved to the molding position even when the attachment is completed, and the carcass band and the belt band only stand by at another position. This prevents an improvement in productivity of the green tire.

In view of such a circumstance, an object of the invention is to provide a green tire manufacturing method and a green tire manufacturing apparatus with improved productivity.

The invention includes embodiments to be described below.

[1] Provided is a green tire manufacturing method in which a belt band is attached to a carcass band to form a combined body and a sidewall rubber is attached to the combined body to form a green tire, the green tire manufacturing method including: using a green tire manufacturing apparatus having a combined body molding position and a sidewall molding position that are two different positions, a combined body manufacturing step of holding the carcass band on a drum at the combined body molding position, attaching the belt band to the carcass band on the same drum to form the combined body, and pressing a surface of the combined body; a step of moving the combined body from the combined body molding position to the sidewall molding position; and a sidewall molding step of attaching the sidewall rubber to the combined body at the sidewall molding position.

[2] In the green tire manufacturing method according to [1], a plurality of the green tires are continuously molded, and at least a part of the sidewall molding step at the sidewall molding position and at least a part of the combined body manufacturing step at the combined body molding position are performed in parallel.

[3] In the green tire manufacturing method according to [1] or [2], before the pressing of the combined body is completed, a carcass band and a belt band that are bases of a combined body to be molded next stand by on the green tire manufacturing apparatus.

[4] Provided is a green tire manufacturing apparatus in which a belt band is attached to a carcass band to form a combined body and a sidewall rubber is attached to the combined body to form a green tire, in which a combined body molding position and a sidewall molding position are provided as two different positions, the combined body molding position is a position at which the carcass band is held on a predetermined drum, the belt band is attached to the carcass band on the same predetermined drum to form the combined body, and a surface of the combined body is pressed, and the sidewall molding position is a position at which the sidewall rubber is attached to the combined body.

[5] In the green tire manufacturing apparatus according to [4], a shaping drum is provided as the predetermined drum at the combined body molding position, a sidewall drum which is a drum different from the shaping drum is provided at the sidewall molding position, and a transfer device configured to receive the combined body from the shaping drum and deliver the combined body to the sidewall drum is provided.

[6] In the green tire manufacturing apparatus according to [4], a transfer device configured to transfer the predetermined drum from the combined body molding position to the sidewall molding position is provided, and the sidewall molding position is a position at which the sidewall rubber is attached to the combined body on the predetermined drum.

By using the method and the apparatus described above, the productivity of the green tire is improved.

BRIEF DESCRIPTION OF THE DRAWINGS

FIG. 2A is a view when an inner liner is attached; FIG. 2B is a view when rubber chafers are attached; FIG. 2C is a view when a carcass ply is attached; FIG. 2D is a view when beads are set;

FIG. 3A to FIG. 3D are views illustrating steps in a shaping drum; FIG. 3A is a view when bead holding units of the shaping drum hold the carcass band; FIG. 3B is a view when shaping is performed; FIG. 3C is a view when turn-up is performed; FIG. 3D is a view when a belt band is attached to the carcass band substantially having a tire shape;

FIG. 4 is a block diagram of a control unit and the like;

3

Figure 9:
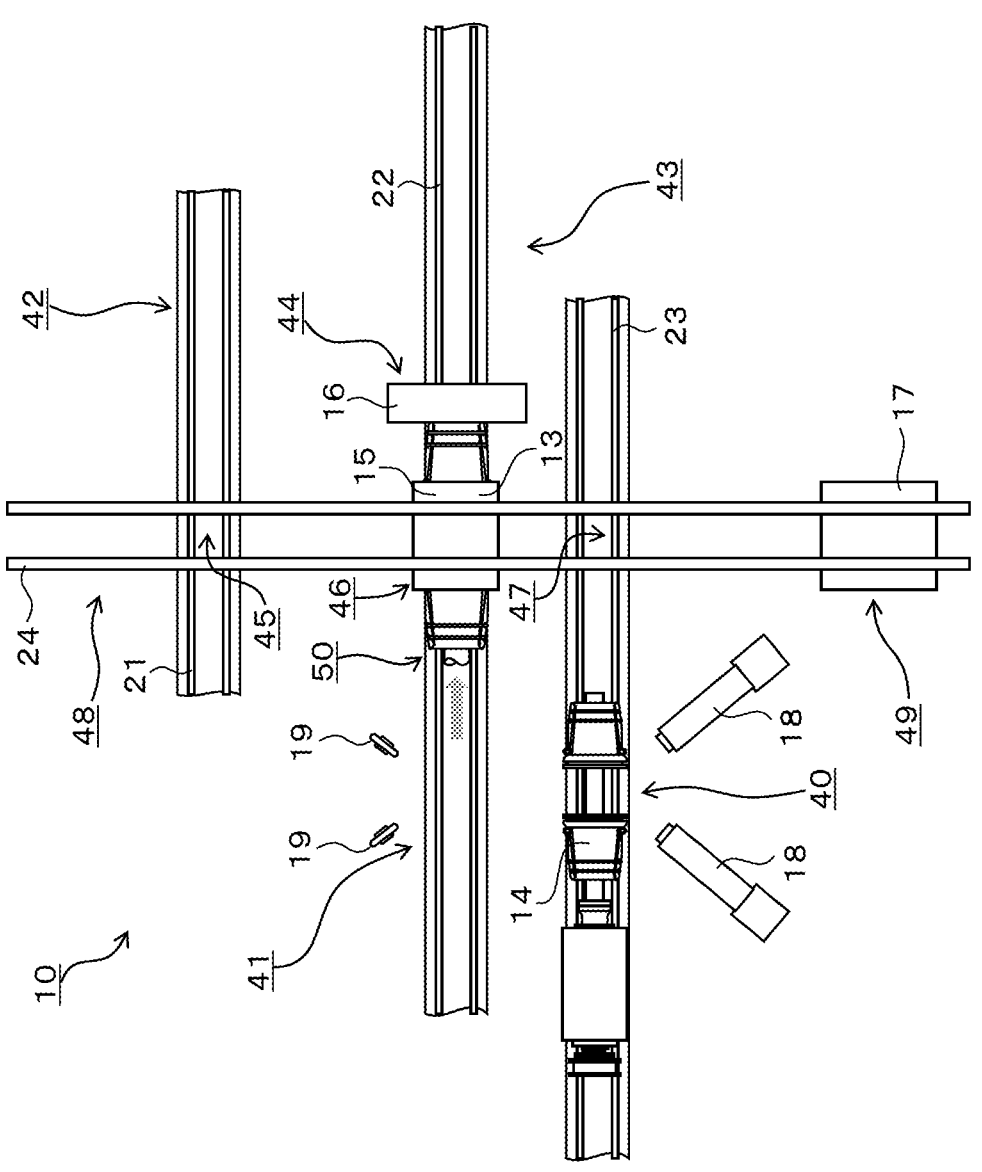
Figure 10:
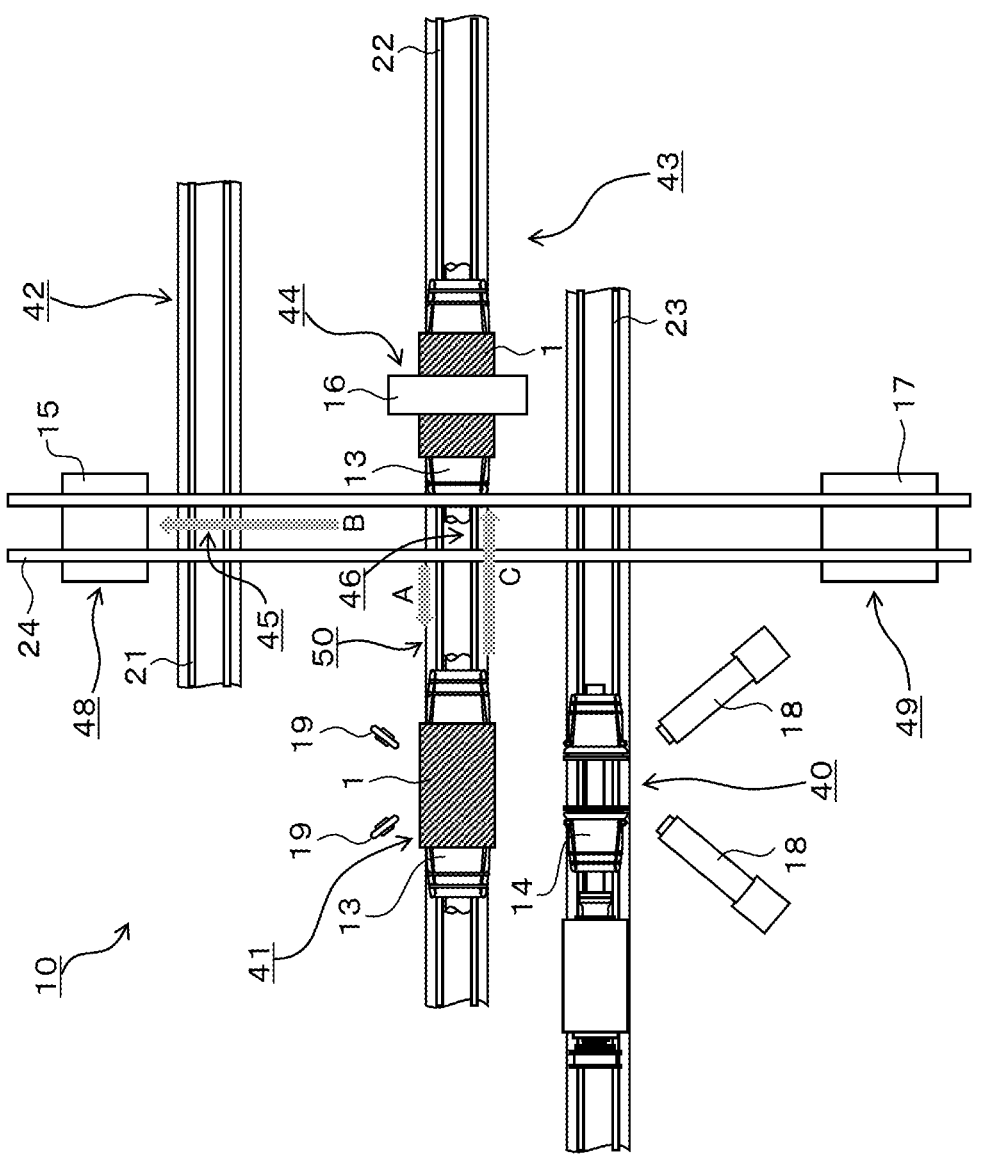
Figure 11:
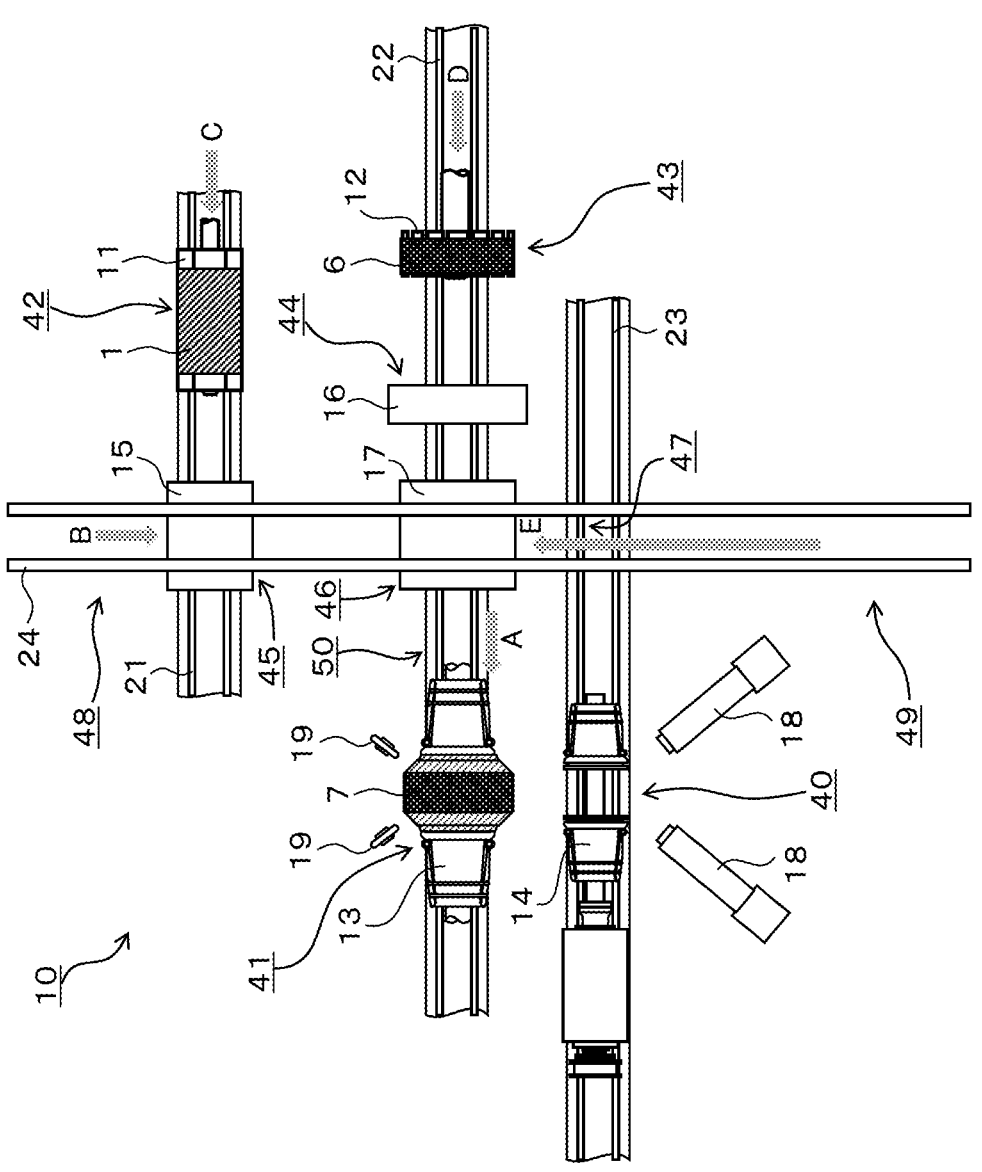
Figure 12:
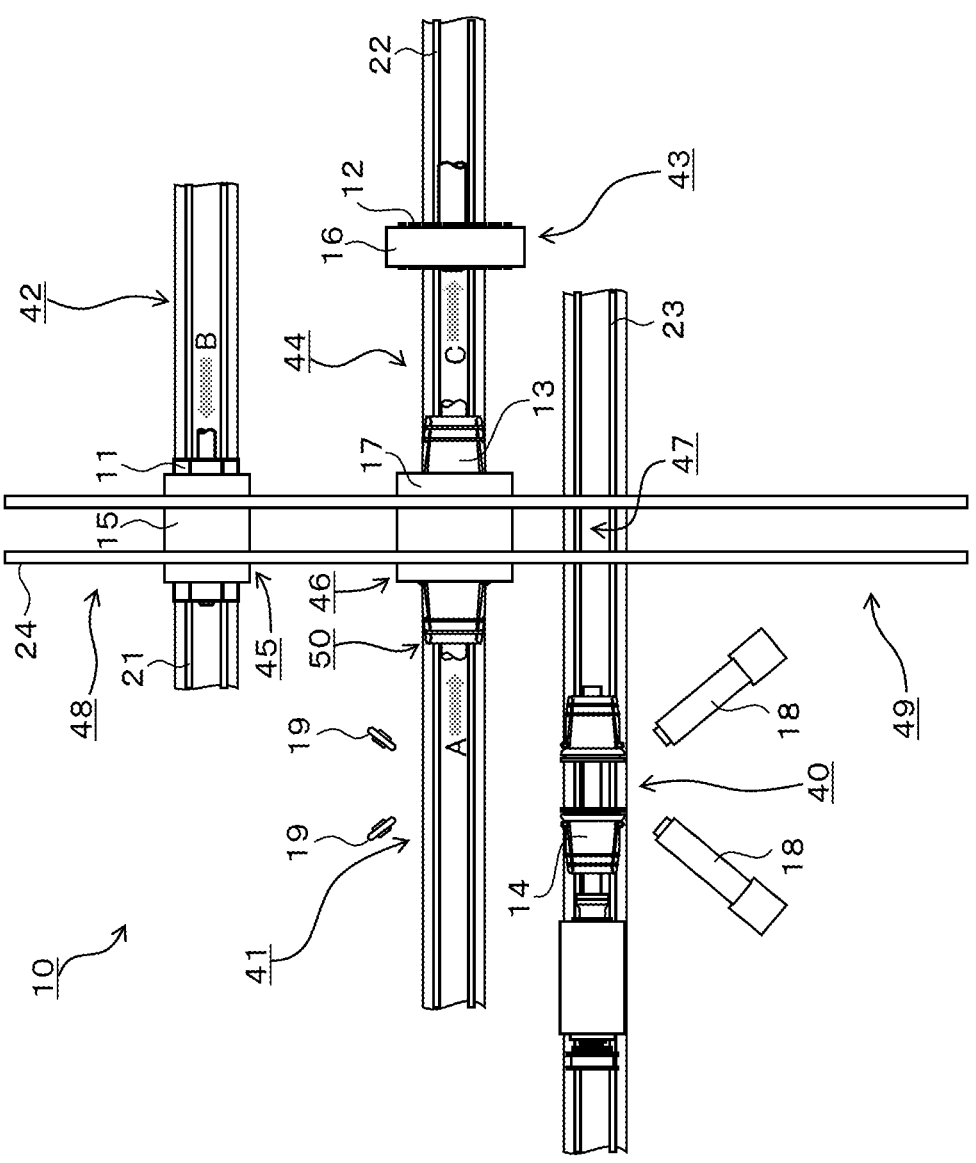
Figure 13:
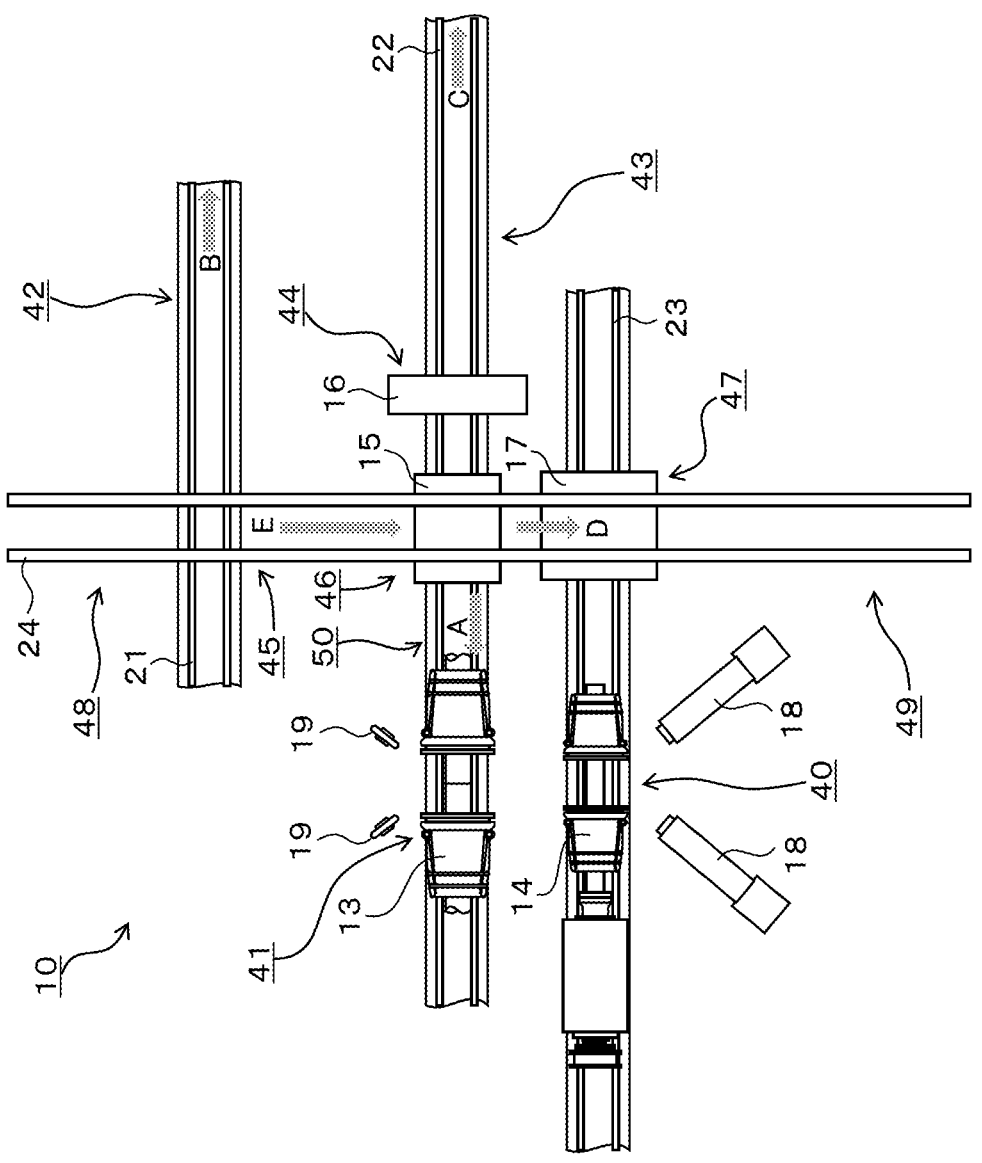
Figure 14:
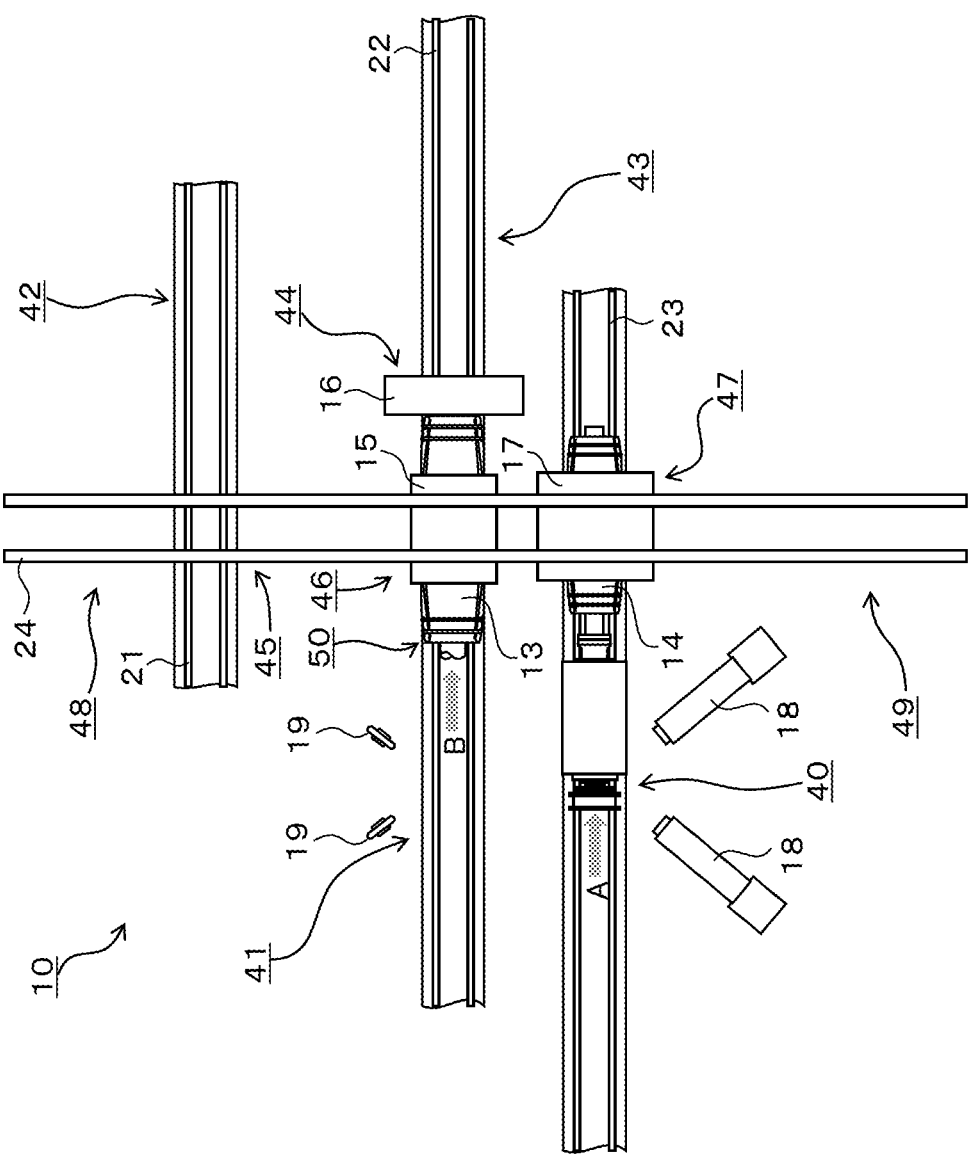
Figure 15:
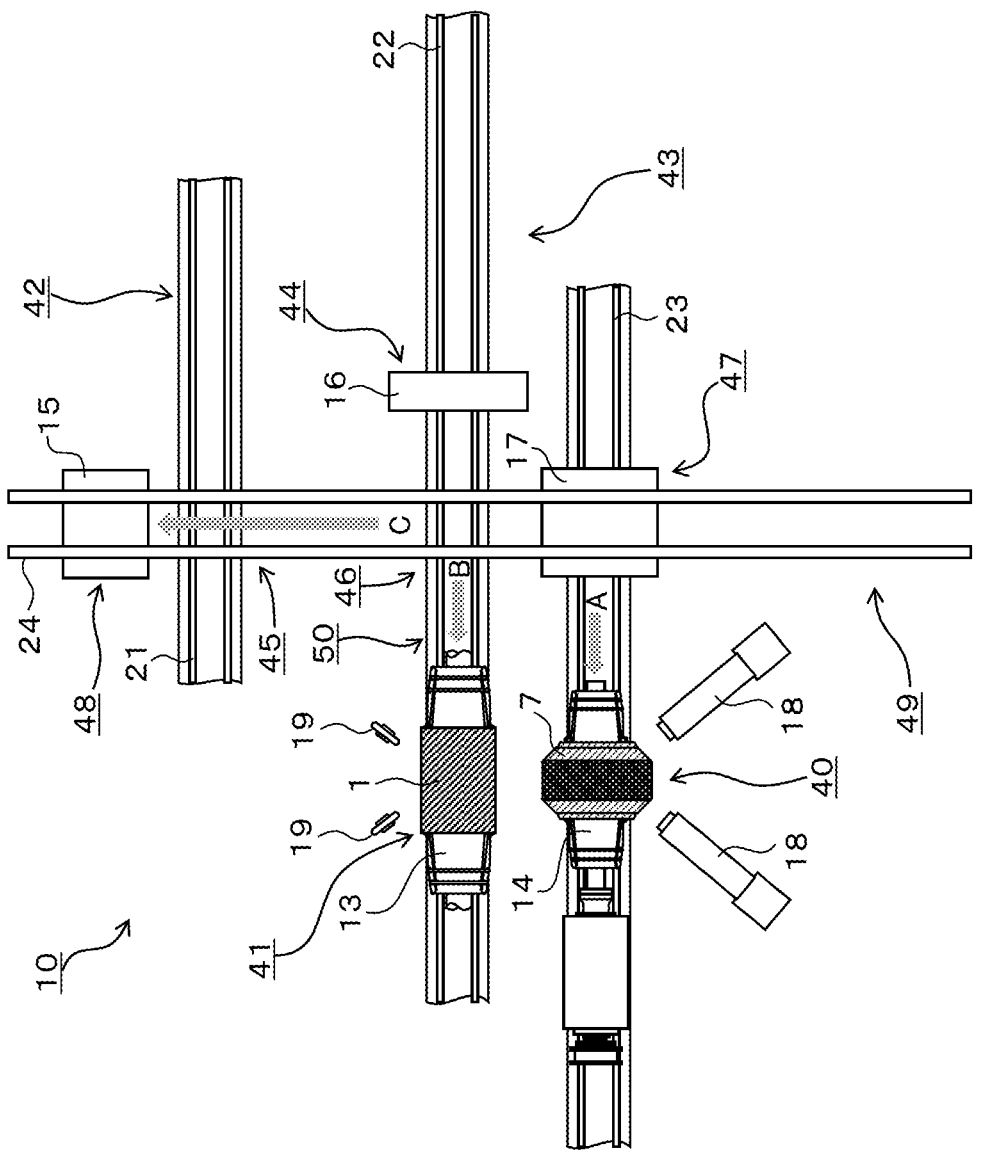
Figure 16:
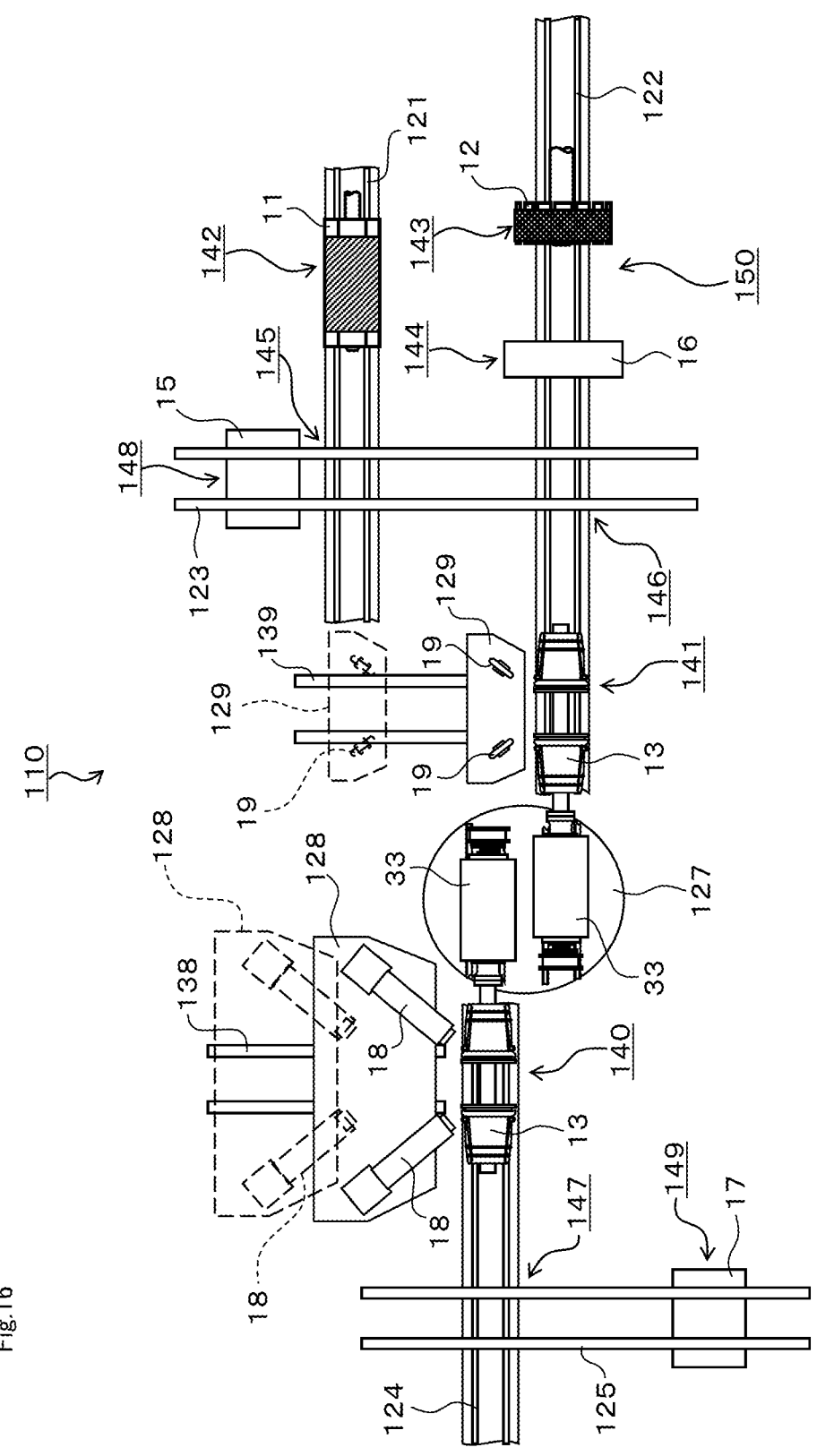

FIG. 9 is a layout view when the shaping drum receives the carcass band;

FIG. 10 is a layout view when the shaping drum receives the belt band;

FIG. 11 is a layout view when a combined body is pressed;

FIG. 12 is a layout view when the combined body is delivered to a green tire transfer;

FIG. 13 is a layout view when the combined body moves to a sidewall drum delivery position;

FIG. 14 is a layout view when the combined body is delivered to a sidewall drum;

FIG. 15 is a layout view when a sidewall rubber is wound around the combined body; and FIG. 16 is a layout view of a green tire manufacturing apparatus according to a second embodiment.

DESCRIPTION OF EMBODIMENTS

Embodiments will be described with reference to the drawings. The embodiments to be described below are merely examples, and modifications appropriately made within a range without departing from the gist of the invention are included in the scope of the invention.

1. First Embodiment

Figure 1:
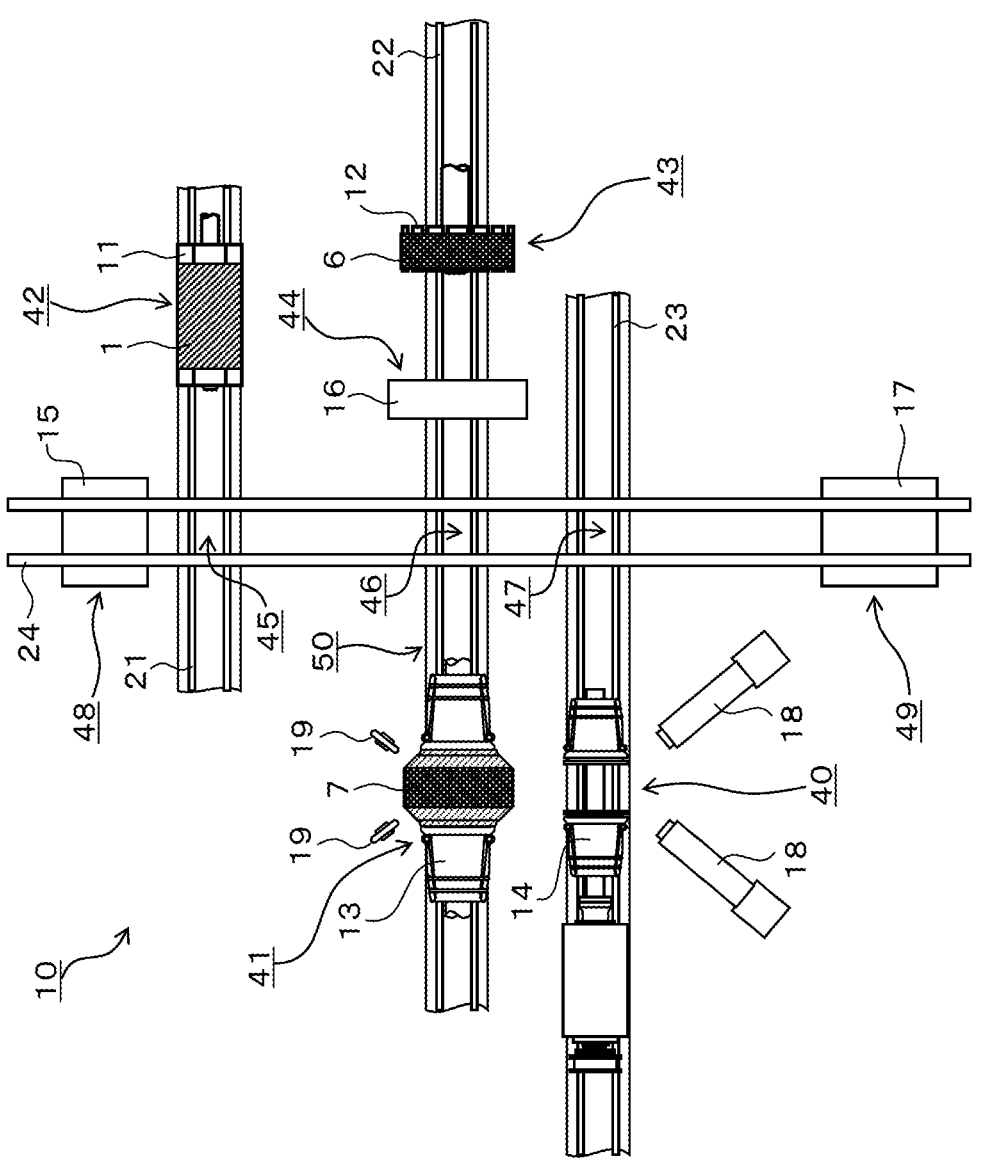
FIG. 1 is a layout view of a green tire manufacturing apparatus according to a first embodiment.

As illustrated in FIG. 1, a green tire manufacturing apparatus 10 according to a first embodiment includes a carcass band drum 11, a belt band drum 12, a shaping drum 13, and a sidewall drum 14, which serve as drums. In addition, the green tire manufacturing apparatus 10 includes a carcass band transfer 15, a belt band transfer 16, and a green tire transfer 17 as transfer devices for transferring various members.

The green tire manufacturing apparatus 10 includes two sidewall rubber supply devices 18. Further, the green tire manufacturing apparatus 10 has first to fourth passages 21, 22, 23, and 24 as passages through which the transfer devices move.

The first to fourth passages 21, 22, 23, and 24 are linear passages. The first passage 21, the second passage 22, and the third passage 23 are disposed in parallel. The second passage 22 is between the first passage 21 and the third passage 23. Each of the first passage 21, the second passage 22, and the third passage 23 includes two parallel rails. The rails constituting the first passage 21, the second passage 22, and the third passage 23 are fixed on a predetermined table that is in contact with a floor.

On the other hand, the fourth passage 24 extends in a direction perpendicular to extending directions of the first passage 21, the second passage 22, and the third passage 23. The fourth passage 24 intersects the first passage 21, the second passage 22, and the third passage 23. The fourth passage 24 also includes two parallel rails. The rails constituting the fourth passage 24 are disposed away from the floor and above the floor.

The carcass band drum 11 is a drum having a known structure in which a plurality of segments are arranged in a drum circumferential direction. When the plurality of segments move in a drum radial direction, an outer circumferential surface of the carcass band drum 11 increases or decreases in diameter. An increase in diameter means that a diameter is increased, and a decrease in diameter means that the diameter is reduced. When the diameter of the outer circumferential surface of the carcass band drum 11 is reduced, the even-numbered segments and the odd-numbered segments in the drum circumferential direction have different movement timings and movement amounts towards the drum radial direction such that adjacent segments do not interfere with each other.

As illustrated in FIGS. 2A to 2D, an inner liner 2, rubber chafers 3, and a carcass ply 4 are wound around the outer circumferential surface of the carcass band drum 11 to mold a carcass band 1 having a cylindrical shape. Here, the inner liner 2 and the rubber chafers 3 are sheet-shaped members made of rubber. The carcass ply 4 is a sheet-shaped member formed by coating many cords with rubber.

Figures 2A, 2B, 2C, 2D:
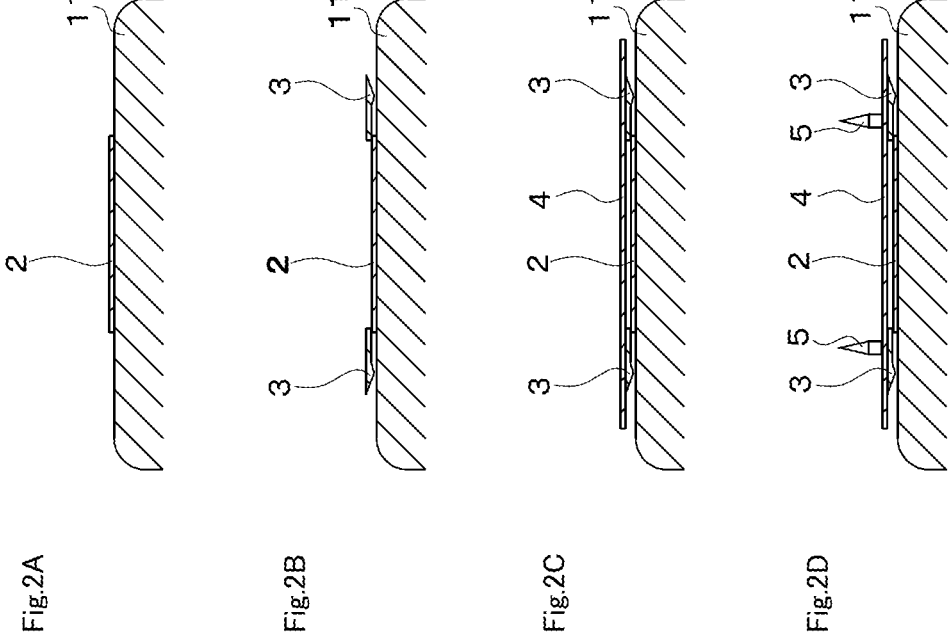
FIGS. 2A to 2D are views illustrating molding steps of a carcass band.

Specifically, first, as illustrated in FIG. 2A, the inner liner 2 is attached to the outer circumferential surface of the carcass band drum 11. Next, as illustrated in FIG. 2B, the rubber chafers 3 are attached near corresponding two ends of the inner liner 2. Next, as illustrated in FIG. 2C, the carcass ply 4 is attached onto the inner liner 2 and the rubber chafers 3. In addition, a member made of rubber or the like is attached as necessary. Thus, the carcass band 1 having a cylindrical shape is completed. Further, beads 5 are set on both sides of the completed carcass band 1 in an axial direction as illustrated in FIG. 2D.

The carcass band 1 is molded in a state in which the diameter of the outer circumferential surface of the carcass band drum 11 is increased. Thereafter, when the diameter of the outer circumferential surface of the carcass band drum 11 is reduced, a gap is formed between the outer circumferential surface having a reduced diameter and the carcass band 1, and the carcass band 1 can be removed from the carcass band drum 11. The removed carcass band 1 can be delivered to the carcass band transfer 15.

Figure 4:
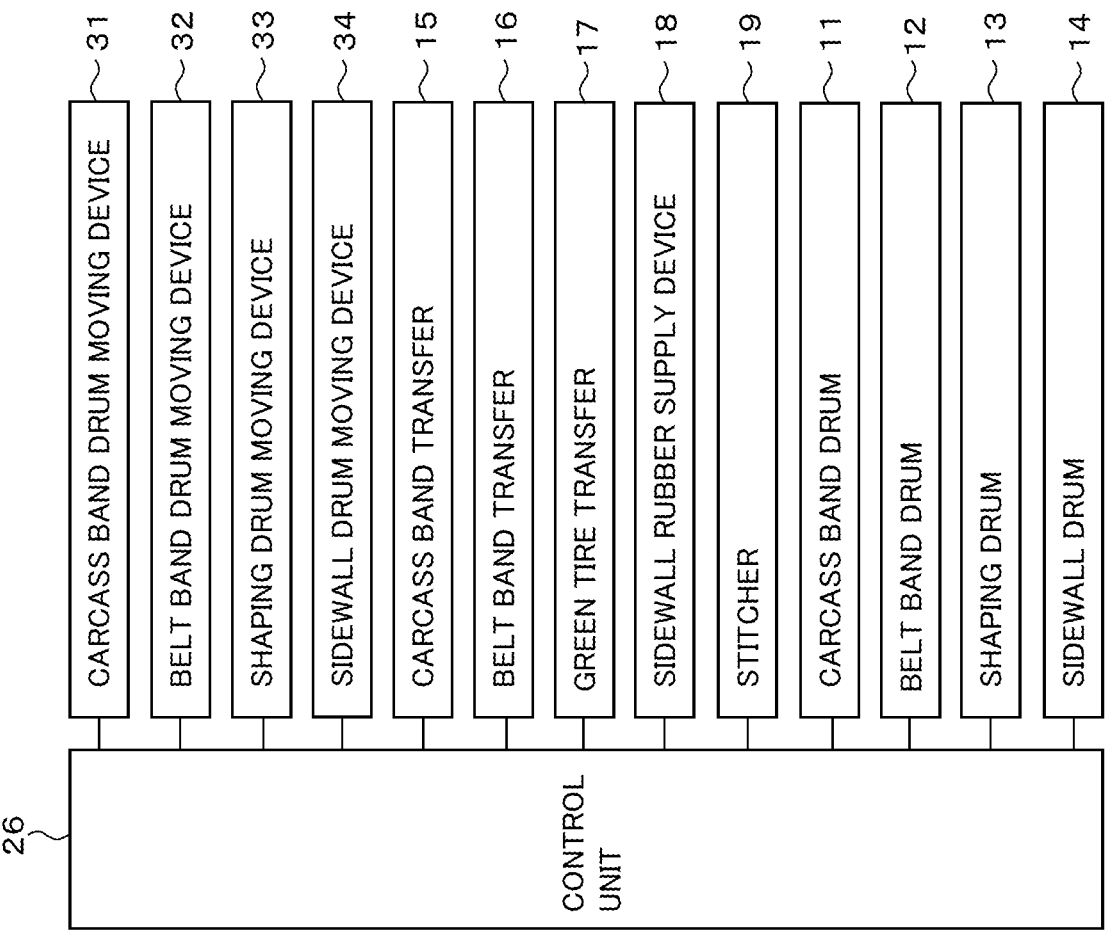

The carcass band drum 11 is held by a carcass band drum moving device 31 (see FIG. 4). When the carcass band drum moving device 31 travels on the rails of the first passage 21, the carcass band drum 11 moves through the first passage 21. The carcass band 1 is molded on the carcass band drum 11 at a carcass band molding position at a position near the first passage 21 (for example, a position adjacent to a right end of the first passage 21 in FIG. 1).

The belt band drum 12 is a drum having a known structure in which a plurality of segments are arranged in the drum circumferential direction. When the plurality of segments move in the drum radial direction, an outer circumferential surface of the belt band drum 12 increases or decreases in diameter.

One or a plurality of belts and one tread rubber are wound around the outer circumferential surface of the belt band drum 12 to mold a belt band 6 having a cylindrical shape. Specifically, first, one or a plurality of belts (not illustrated) are attached to the outer circumferential surface of the belt band drum 12. Next, the tread rubber (not illustrated) is attached onto the belt. In addition, a member made of rubber or the like is attached as necessary. Thus, the belt band 6 having a cylindrical shape is completed. Here, the belt is a sheet-shaped member formed by coating many cords with rubber. The tread rubber is a rubber member having a thickness larger than that of the belt.

The belt band 6 is molded in a state in which the diameter of the outer circumferential surface of the belt band drum 12 is increased. Thereafter, when the diameter of the outer circumferential surface of the belt band drum 12 is reduced, a gap is formed between the outer circumferential surface having a reduced diameter and the belt band 6, and the belt band 6 can be removed from the belt band drum 12. The removed belt band 6 can be delivered to the belt band transfer 16.

The belt band drum 12 is held by a belt band drum moving device 32 (see FIG. 4). When the belt band drum moving device 32 travels on the rails of the second passage 22, the belt band drum 12 moves through the second passage 22. The belt band 6 is molded on the belt band drum 12 at a belt band molding position at a position near the second passage 22 (for example, a position adjacent to a right end of the second passage 22 in FIG. 1).

The shaping drum 13 is a drum having a known structure for performing shaping and turn-up. The shaping drum 13 includes bead holding units 13a (see FIG. 3) that hold portions of the carcass band 1, at which the beads 5 are set, from an inner diameter side of the carcass band 1.

Since it is necessary to narrow an interval between two beads 5 at the time of shaping, an interval between two bead holding units 13a is variable such that the interval between the two beads 5 can be narrowed. The shaping drum 13 can hold not only the carcass band 1 but also a combined body 7 in which the belt band 6 is attached to the carcass band 1.

The shaping and the like are performed as illustrated in FIG. 3. First, although omitted in FIG. 3, the shaping drum 13 is inserted into the inner diameter side of the carcass band 1 held by the carcass band transfer 15. Then, as illustrated in FIG. 3A, the portions of the carcass band 1, at which the beads 5 are set, are held by the two bead holding units 13a respectively. Thereafter, the carcass band transfer 15 releases the carcass band 1, and thus the carcass band 1 is received by the shaping drum 13.

Next, as illustrated in FIG. 3B, when a distance between the two beads 5 is reduced, the shaping is performed in which a portion between the two beads 5 in the carcass band 1 is expanded to form an expanded portion 1a.

Next, as illustrated in FIG. 3C, turn-up is performed in which portions of the carcass band 1 outward of the beads 5 in the axial direction are wound up along the expanded portion 1a.

Next, as illustrated in FIG. 3D, the belt band 6 is attached to an outer circumferential surface of the expanded portion 1a of the carcass band 1. This attachment is performed by disposing the belt band 6 on an outer side of the expanded portion 1a of the carcass band 1 and then expanding the expanded portion 1a in a manner of a further increase in diameter. A combined body in which the belt band 6 is attached to the outer circumferential surface of the carcass band 1 substantially expanded into a tire shape is referred to as the combined body 7.

In the sidewall drum 14 to be described later, a sidewall 8 indicated by two-dot chain lines is provided on a side surface 7a of the combined body 7. The sidewall 8 is molded by winding an elongated ribbon-shaped sidewall rubber around the side surface 7a of the combined body 7 many laps.

Until the combined body 7 is completed, the bead holding units 13a continue to hold the portions of the carcass band 1, at which the beads 5 are set. When the bead holding units 13a release the carcass band 1, the combined body 7 can be removed from the shaping drum 13. The removed combined body 7 can be delivered to the green tire transfer 17.

The shaping drum 13 is held by a shaping drum moving device 33 (see FIG. 4). When the shaping drum moving device 33 travels on the rails of the second passage 22, the shaping drum 13 moves through the second passage 22.

The sidewall drum 14 is a drum that can rotate while holding the combined body 7. A rotation axis of the sidewall drum 14 coincides with a central axis of the combined body 7 held by the sidewall drum 14. The sidewall drum 14 is held by a sidewall drum moving device 34 (see FIG. 4). When the sidewall drum moving device 34 travels on the rails of the third passage 23, the sidewall drum 14 moves through the third passage 23.

The carcass band transfer 15 includes a plurality of adsorption units (not illustrated) arranged in a circle. The carcass band 1 enters an inside of the circle defined by the adsorption units, and the adsorption units adsorb the outer circumferential surface of the carcass band 1, whereby the carcass band transfer 15 can hold the carcass band 1. When the adsorption units stop adsorption, the carcass band transfer 15 releases the carcass band 1. When the adsorption units do not adsorb the carcass band 1, the carcass band 1 is received and delivered.

The carcass band transfer 15 is suspended by the rails of the fourth passage 24. The carcass band transfer 15 includes a servo motor (not illustrated) as a device for moving along the rails. When the servo motor drives the carcass band transfer 15, the carcass band transfer 15 moves through the fourth passage 24.

The belt band transfer 16 includes a plurality of holding members (not illustrated) arranged in a circle. These holding members are simultaneously movable, using a link mechanism or the like, in a radial direction of the circle defined by the holding members.

The belt band 6 enters an inside of the circle defined by the holding members, and the holding members move inward in the radial direction, whereby the belt band transfer 16 can hold the belt band 6. When the holding members move outward in the radial direction, the belt band transfer 16 releases the belt band 6. When the holding members do not hold the belt band 6, the belt band 6 is received and delivered.

The belt band transfer 16 includes a servo motor (not illustrated) as a device for moving along the rails of the second passage 22. When the servo motor drives the belt band transfer 16, the belt band transfer 16 moves through the second passage 22.

The green tire transfer 17 includes a plurality of holding members (not illustrated) arranged in a circle. These holding members are simultaneously movable, using a link mechanism or the like, in a radial direction of the circle defined by the holding members. Each of the holding members has a shape of not being in point contact or line contact but in surface contact with a surface of a green tire so as not to damage the green tire.

The combined body 7 enters an inside of the circle defined by the holding members, and the holding members move inward in the radial direction, whereby the green tire transfer 17 can hold the combined body 7. The green tire transfer 17 can also similarly hold the green tire in which the sidewall 8 is molded on the side surface 7a of the combined body 7. When the holding members move outward in the radial direction, the green tire transfer 17 releases the combined body 7 and the like. When the holding members do not hold the combined body 7 and the like, the combined body 7 and the like are received and delivered.

The green tire transfer 17 is suspended by the rails of the fourth passage 24. The green tire transfer 17 includes a servo motor (not illustrated) as a device for moving along the rails. When the servo motor drives the green tire transfer 17, the green tire transfer 17 moves through the fourth passage 24.

A position on one end side (left side in FIG. 1) of the second passage 22 is a combined body pressing position 41 that is a position for pressing the combined body 7. The pressing means pressing to apply a pressure. The combined body pressing position 41 is provided with stitchers 19 which are pressing devices having a known structure.

When the combined body 7 held by the shaping drum 13 reaches the combined body pressing position 41, the stitchers 19 move along surfaces of the combined body 7 while pressing the surfaces. As a result, members constituting the combined body 7 are press-bonded to each other. Two stitchers 19 press the surfaces on both sides of the combined body 7 in the axial direction respectively.

A part of the third passage 23 serves as a sidewall molding position 40 for attaching the sidewall rubber to the combined body 7. At the sidewall molding position 40 is provided the sidewall rubber supply devices 18 for extruding the ribbon-shaped sidewall rubber. Two sidewall rubber supply devices 18 are provided.

The sidewall drum 14 holds the combined body 7 and reaches the sidewall molding position 40. Then, the combined body 7 is rotated while being held at the sidewall molding position 40. During the rotation, the elongated sidewall rubber extruded from the sidewall rubber supply devices 18 is wound around the side surfaces 7a of the combined body 7. The side surfaces 7a are surfaces on corresponding two sides of the combined body 7 in the axial direction (see FIG. 3D).

At this time, the sidewall rubber extruded from one sidewall rubber supply device 18 is wound around one side surface 7a of the combined body 7 in the axial direction, and the sidewall rubber extruded from the other sidewall rubber supply device 18 is wound around the other side surface 7a of the combined body 7 in the axial direction.

The wound sidewall rubber is attached to the side surfaces 7a of the combined body 7. When a necessary amount of sidewall rubber is attached to the side surfaces 7a of the combined body 7, molding of the sidewall 8 is completed.

A position on one end side (right side in FIG. 1) of the first passage 21 is a carcass band drum standby position 42. In the second passage 22, a position on an opposite side (right side in FIG. 1) of the combined body pressing position 41 is a belt band drum standby position 43. In the second passage 22, a belt band transfer standby position 44 is present between the combined body pressing position 41 and the belt band drum standby position 43.

An intersecting position between the fourth passage 24 and the first passage 21 is a carcass band delivery position 45. An intersecting position between the fourth passage 24 and the second passage 22 is a shaping drum delivery position 46. The belt band transfer standby position 44 is between the shaping drum delivery position 46 and the belt band drum standby position 43. An intersecting position between the fourth passage 24 and the third passage 23 is a sidewall drum delivery position 47.

A position on one end side of the fourth passage 24 outward (upper side in FIG. 1) of the first passage 21 is a carcass band transfer standby position 48. A position on the other end side of the fourth passage 24 outward (lower side in FIG. 1) of the third passage 23 is a green tire transfer standby position 49.

The second passage 22 is also a combined body molding position 50 at which the combined body 7 is manufactured. At the combined body molding position 50, the carcass band 1 is held by the shaping drum 13, the belt band 6 is attached to the carcass band 1 to mold the combined body 7, and the surfaces of the combined body 7 are further pressed by the stitchers 19.

The green tire manufacturing apparatus 10 includes a control unit 26 illustrated in FIG. 4. Various drums such as the shaping drum 13, various transfer devices such as the green tire transfer 17, various moving devices such as the shaping drum moving device 33, the sidewall rubber supply devices 18, the stitchers 19, and the like are connected to the control unit 26. The control unit 26 controls the connected devices and the like according to instructions, programs, or the like from an operator.

Figure 5:
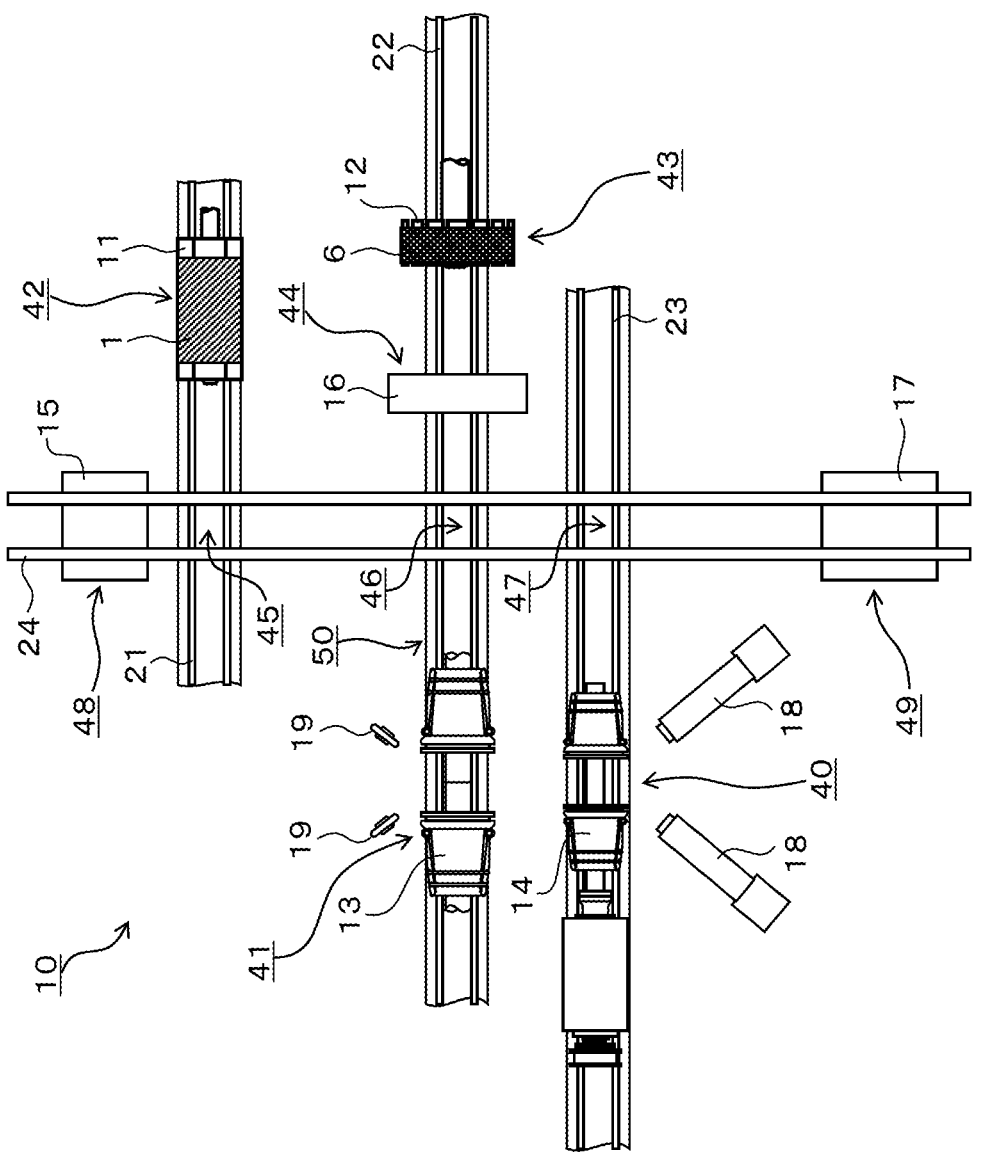
FIG. 5 is a layout view when a green tire is started to be molded.

In the green tire manufacturing apparatus 10 having the above configuration, the green tire is molded. First, the drums and the transfers are in positions illustrated in FIG. 5. At this time, the carcass band drum 11 holds the carcass band 1 at the carcass band drum standby position 42. The belt band drum 12 holds the belt band 6 at the belt band drum standby position 43. The carcass band transfer 15 holds the beads 5 (omitted in FIG. 5) at the carcass band transfer standby position 48.

Figure 6:
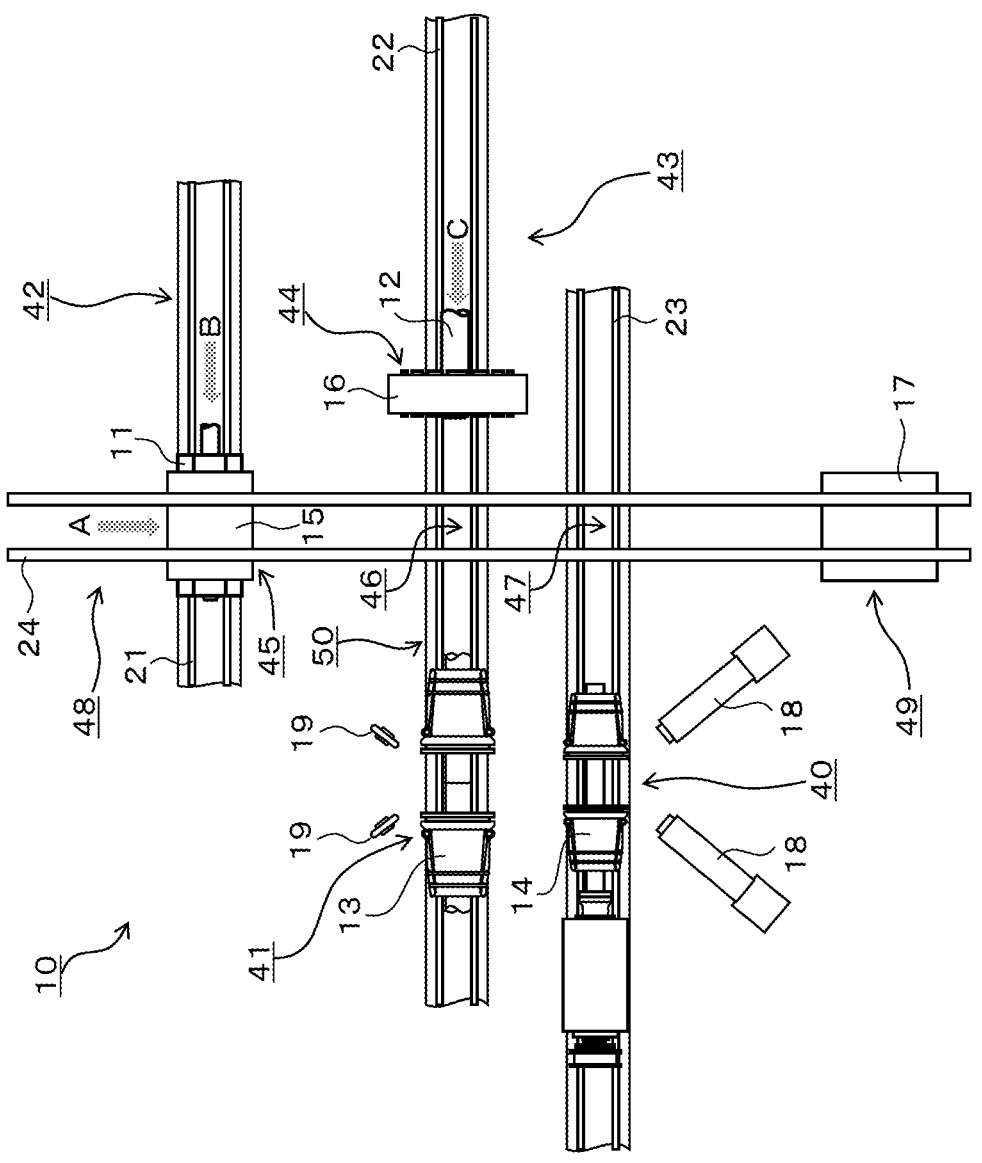
FIG. 6 is a layout view when the carcass band or the like is held by a transfer.

Next, as indicated by an arrow A in FIG. 6, the carcass band transfer 15 moves from the carcass band transfer standby position 48 to the carcass band delivery position 45. Next, as indicated by an arrow B in FIG. 6, the carcass band drum 11 moves from the carcass band drum standby position 42 to the carcass band delivery position 45 and enters an inside of the carcass band transfer 15. Then, the carcass band 1 is delivered from the carcass band drum 11 to the carcass band transfer 15. Thereafter, the beads 5 are set on the carcass band 1 in the carcass band drum 11.

The delivery of the carcass band 1 from the carcass band drum 11 to the carcass band transfer 15 is performed by the carcass band transfer 15 holding the carcass band 1 by the adsorption units and then removing the carcass band 1 from the carcass band drum 11. In this manner, the delivery of various members such as the carcass band 1 is performed by holding the member by one drum or transfer and removing the member from the other drum or transfer.

Simultaneously with the movement of the carcass band drum 11, as indicated by an arrow C in FIG. 6, the belt band drum 12 moves from the belt band drum standby position 43 to the belt band transfer standby position 44 and enters an inside of the belt band transfer 16. Then, the belt band 6 is delivered from the belt band drum 12 to the belt band transfer 16.

Figure 7:
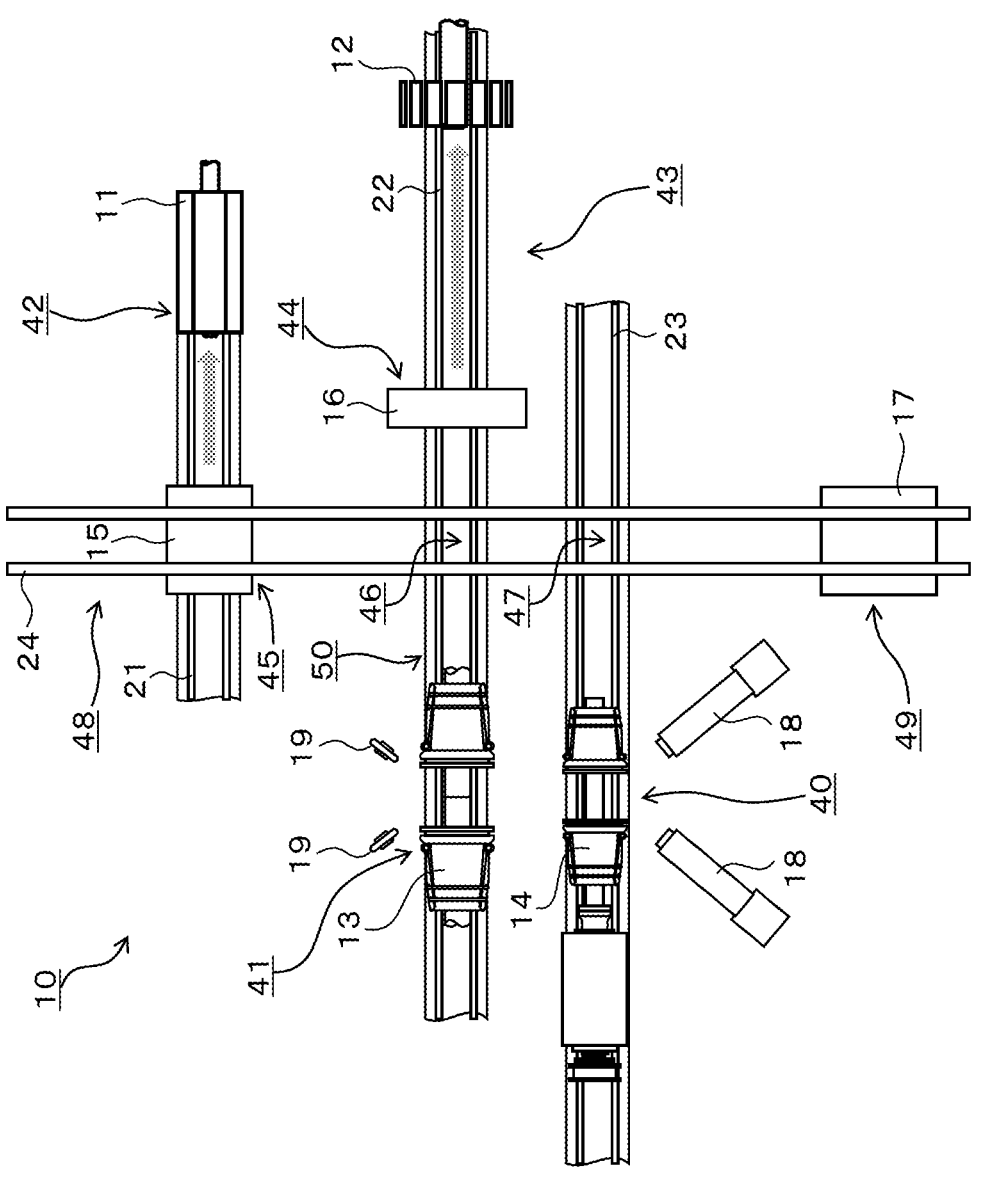
FIG. 7 is a layout view when a carcass band drum or the like is moved to a molding position.

Next, as illustrated by arrows in FIG. 7, the carcass band drum 11 moves to the carcass band molding position (not illustrated) for molding the subsequent carcass band 1. At the same time, the belt band drum 12 moves to the belt band molding position (not illustrated) for molding the subsequent belt band 6. After moving to the molding positions, respectively, the subsequent carcass band 1 is molded on the carcass band drum 11, and the subsequent belt band 6 is molded on the belt band drum 12.

Figure 8:
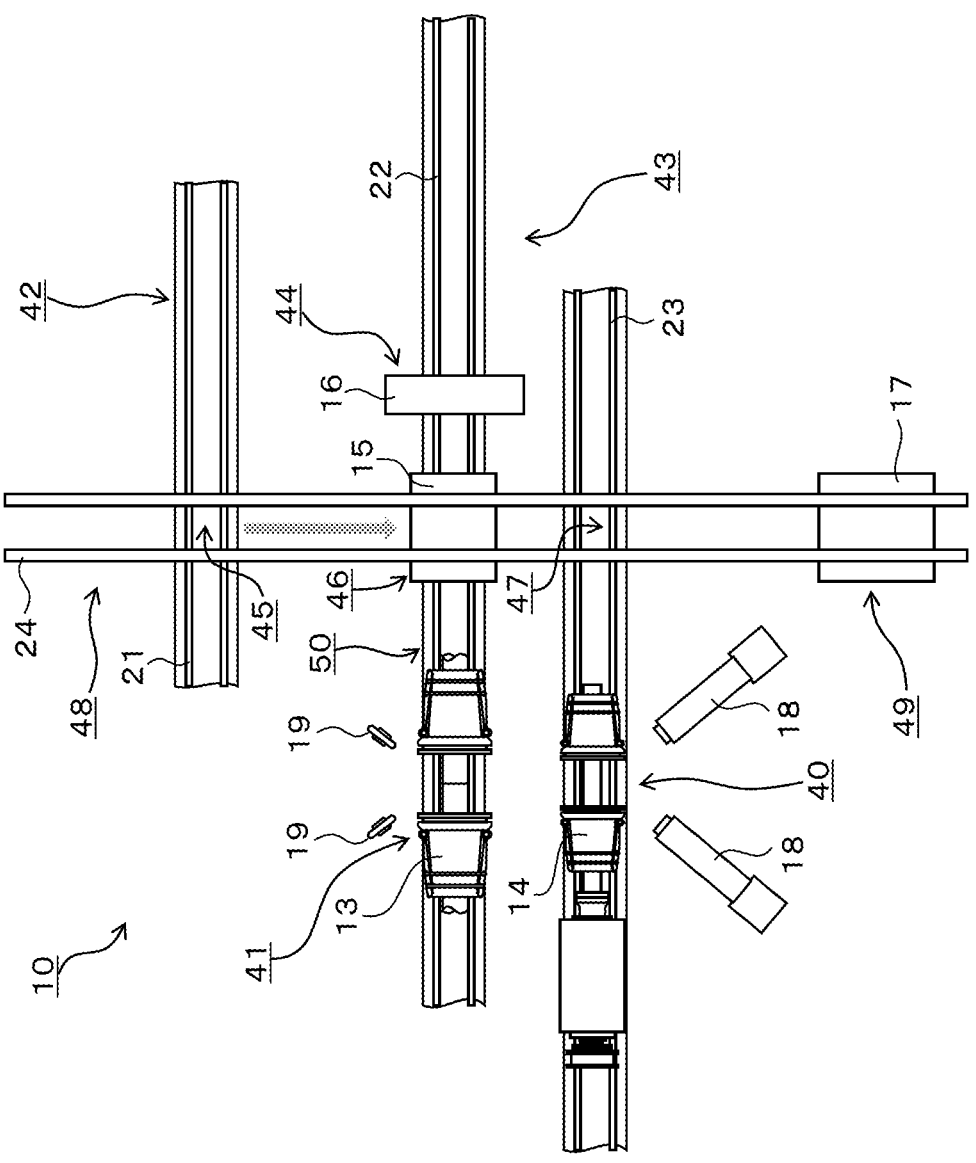
FIG. 8 is a layout view when a carcass band transfer moves to a shaping drum delivery position.

Next, as illustrated in FIG. 8, the carcass band transfer 15 that holds the carcass band 1 moves from the carcass band delivery position 45 to the shaping drum delivery position 46.

Next, as indicated by an arrow in FIG. 9, the shaping drum 13 moves from the combined body pressing position 41 to the shaping drum delivery position 46 and enters an inside of the carcass band 1 held by the carcass band transfer 15. Then, the carcass band 1 is delivered from the carcass band transfer 15 to the shaping drum 13. As illustrated in FIG. 3A, the carcass band 1 is held by the bead holding units 13a of the shaping drum 13.

Next, as indicated by an arrow A in FIG. 10, the shaping drum 13 that holds the carcass band 1 temporarily moves from the shaping drum delivery position 46 to the combined body pressing position 41. Next, as indicated by an arrow B in FIG. 10, the carcass band transfer 15 moves from the shaping drum delivery position 46 to the carcass band transfer standby position 48. The carcass band transfer 15 that arrives at the carcass band transfer standby position 48 holds the subsequent bead 5.

Next, as indicated by an arrow C in FIG. 10, the shaping drum 13 that holds the carcass band 1 moves to the belt band transfer standby position 44 at which the belt band transfer 16 stands by, and enters an inside of the belt band 6 held by the belt band transfer 16.

At the belt band transfer standby position 44, shaping and turn-up are performed on the carcass band 1 on the shaping drum 13 as illustrated in FIGS. 3B and 3C. Then, as illustrated in FIG. 3D, the belt band 6 held by the belt band transfer 16 is attached to the carcass band 1 expanded by the shaping. Accordingly, the combined body 7 is formed.

Next, as indicated by an arrow A in FIG. 11, the shaping drum 13 that holds the combined body 7 moves from the belt band transfer standby position 44 to the combined body pressing position 41. After the movement, the combined body 7 is pressed by the stitchers 19 at the combined body pressing position 41.

Simultaneously with or before or after the shaping drum 13 is moved in FIG. 11, as illustrated by an arrow B in FIG. 11, the carcass band transfer 15 that holds the beads 5 moves from the carcass band transfer standby position 48 to the carcass band delivery position 45.

Before the shaping drum 13 is moved in FIG. 11, the molding of the carcass band 1 and the belt band 6 serving as bases of the combined body 7 to be molded next is completed. Then, simultaneously with or before or after the shaping drum 13 is moved, as indicated by arrows C and D in FIG. 11, the carcass band drum 11 that holds the carcass band 1 reaches the carcass band drum standby position 42, and the belt band drum 12 that holds the belt band 6 reaches the belt band drum standby position 43.

After the shaping drum 13 is moved, as indicated by an arrow E in FIG. 11, the green tire transfer 17 moves from the green tire transfer standby position 49 to the shaping drum delivery position 46.

After the pressing of the combined body 7 by the stitchers 19 is completed, as indicated by an arrow A in FIG. 12, the shaping drum 13 that holds the combined body 7 moves from the combined body pressing position 41 to the shaping drum delivery position 46 at which the green tire transfer 17 stands by. The shaping drum 13 enters an inside of the green tire transfer 17. Then, the combined body 7 is delivered from the shaping drum 13 to the green tire transfer 17.

Simultaneously with or before or after the shaping drum 13 is moved, as indicated by an arrow B in FIG. 12, the carcass band drum 11 that holds the carcass band 1 moves from the carcass band drum standby position 42 to the carcass band delivery position 45 at which the carcass band transfer 15 stands by. Then, the carcass band 1 is delivered from the carcass band drum 11 to the carcass band transfer 15, and the beads 5 are set on the carcass band 1.

Simultaneously with or before or after the shaping drum 13 is moved, as indicated by an arrow C in FIG. 12, the belt band transfer 16 moves from the belt band transfer standby position 44 to the belt band drum standby position 43 at which the belt band drum 12 for holding the belt band 6 stands by. Then, the belt band 6 is delivered from the belt band drum 12 to the belt band transfer 16.

Next, as indicated by an arrow A in FIG. 13, after the combined body 7 is delivered to the green tire transfer 17, the shaping drum 13 moves from the shaping drum delivery position 46 to the combined body pressing position 41. Simultaneously with or before or after the shaping drum 13 is moved, as illustrated by arrows B and C in FIG. 13, the carcass band drum 11 moves to the carcass band molding position (not illustrated) for molding the subsequent carcass band 1. At the same time, the belt band drum 12 moves to the belt band molding position (not illustrated) for molding the subsequent belt band 6.

Next, as indicated by an arrow D in FIG. 13, the green tire transfer 17 that holds the combined body 7 moves from the shaping drum delivery position 46 to the sidewall drum delivery position 47. Simultaneously with or immediately after the green tire transfer 17 is moved, as indicated by an arrow E in FIG. 13, the carcass band transfer 15 that holds the carcass band 1 moves from the carcass band delivery position 45 to the shaping drum delivery position 46.

Next, as indicated by an arrow A in FIG. 14, the sidewall drum 14 moves from the sidewall molding position 40 to the sidewall drum delivery position 47 at which the green tire transfer 17 for holding the combined body 7 stands by. Then, the sidewall drum 14 enters an inner diameter side of the combined body 7 held by the green tire transfer 17. Thereafter, the combined body 7 is delivered from the green tire transfer 17 to the sidewall drum 14.

Simultaneously with or before or after the sidewall drum 14 is moved, as indicated by an arrow B in FIG. 14, the shaping drum 13 moves from the combined body pressing position 41 to the shaping drum delivery position 46 at which the carcass band transfer 15 for holding the carcass band 1 stands by. Then, the carcass band 1 is delivered from the carcass band transfer 15 to the shaping drum 13.

Next, as indicated by an arrow A in FIG. 15, the sidewall drum 14 that holds the combined body 7 moves from the sidewall drum delivery position 47 to the sidewall molding position 40. Then, at the sidewall molding position 40, the ribbon-shaped sidewall rubber extruded from the sidewall rubber supply devices 18 is wound around the combined body 7 to mold the sidewall 8.

After the sidewall rubber is wound, surfaces of the sidewalls 8 are pressed by two stitchers (not illustrated) which are pressing devices having a known structure. The sidewalls 8 are press-bonded against the combined body 7 more firmly by the pressing, and the green tire is completed.

Simultaneously with or before or after the sidewall drum 14 is moved, as indicated by an arrow B in FIG. 15, the shaping drum 13 that holds the carcass band 1 moves from the shaping drum delivery position 46 to the combined body pressing position 41.

After the shaping drum 13 is moved, as indicated by an arrow C in FIG. 15, the carcass band transfer 15 is moved from the shaping drum delivery position 46 to the carcass band transfer standby position 48.

After the carcass band transfer 15 is moved to the carcass band transfer standby position 48, as indicated by the arrow C in FIG. 10, the shaping drum 13 moves through the second passage 22, which is the combined body molding position 50, and enters an inner diameter side of the belt band transfer 16. Then, the belt band 6 is attached to the carcass band 1.

During a period from a start to an end of the winding of the sidewall rubber around the combined body 7 at the sidewall molding position 40, an operation at the combined body molding position 50 at least proceeds to a position at which the shaping drum 13 holds the subsequent carcass band 1. The operation may further proceed during the period from the start to the end of the winding of the sidewall rubber, and the operation may proceed to any one of shaping, turn-up, attachment of the belt band 6 to the carcass band 1, and pressing of the combined body 7 by the stitchers 19.

In this manner, at least a part of molding steps of the sidewall 8 at the sidewall molding position 40 and at least a part of manufacturing steps of the combined body 7 at the combined body molding position 50 are performed in parallel.

The molding steps of the sidewall 8 are steps from the start to the end of the winding of the sidewall rubber around the combined body 7. The manufacturing steps of the combined body 7 at the combined body molding position 50 are steps from when the carcass band 1 is held by the shaping drum 13 to when the pressing of the combined body 7 by the stitchers 19 is completed.

When the green tire is completed, the green tire is delivered from the sidewall drum 14 to the green tire transfer 17 at the sidewall drum delivery position 47. Thereafter, the green tire is transferred on the fourth passage 24 by the green tire transfer 17, and is carried out from an end (lower end in a case of FIG. 15) of the fourth passage 24.

It is preferable that the attachment of the belt band 6 to the carcass band 1 is completed on the shaping drum 13 before the green tire is carried out and the green tire transfer 17 and the sidewall drum 14 are empty. Alternatively, it is preferable that the steps further proceed and the pressing of the combined body 7 by the stitchers 19 is completed. The combined body 7 serves as a basis of a green tire to be completed next.

The above steps until the green tire is completed are performed one after another, and a plurality of green tires are produced. The green tire becomes a pneumatic tire by being placed in a mold for vulcanization.

As described above, in the method according to the first embodiment, the combined body molding position 50 and the sidewall molding position 40 are used as two different positions. Specifically, at the combined body molding position 50, a combined body manufacturing step is executed in which the carcass band 1 is held on the shaping drum 13, the belt band 6 is attached to the carcass band 1 on the shaping drum 13 to form the combined body 7, and the surfaces of the combined body 7 are pressed. Next, a step of moving the combined body 7 from the combined body molding position 50 to the sidewall molding position 40 is executed. Then, at the sidewall molding position 40, a sidewall molding step of attaching the sidewall rubber to the combined body 7 is executed.

Therefore, the combined body molding position 50 can be empty during the execution of the sidewall molding step. Productivity of the green tire can be improved using the empty combined body molding position 50 in the manufacturing steps of the subsequent combined body 7 or the like.

For example, as described above, at least a part of the molding steps of the sidewall 8 at the sidewall molding position 40 and at least a part of the manufacturing steps of the combined body 7 at the combined body molding position 50 are performed in parallel. Therefore, a problem that the combined body 7 cannot be manufactured until the molding of the sidewall 8 is completed as in the related art does not arise.

Further, before the pressing of the combined body 7 by the stitchers 19 is completed, the molding of the carcass band 1 and the belt band 6 serving as the bases of the combined body 7 to be molded next is completed, and the carcass band 1 and the belt band 6 stand by on the green tire manufacturing apparatus 10. Therefore, after the combined body 7 is moved to the sidewall molding position 40, the manufacturing of the subsequent combined body 7 can be started without delay.

Various changes can be made to the above embodiment. Positions at which the various members are delivered are not limited to the above positions. For example, the belt band 6 can be delivered between the shaping drum 13 and the belt band transfer 16 at any position on the second passage 22 as long as the position is a position at which the belt band drum 12 is not present. The belt band 6 can be delivered between the belt band transfer 16 and the belt band drum 12 at any position on the second passage 22 as long as the position is a position at which the shaping drum 13 is not present.

Shaping, turn-up, and attachment of the belt band 6 to the carcass band 1 expanded by the shaping can be performed on the carcass band 1 on the shaping drum 13 at any position on the second passage 22. For example, the shaping or the like can be performed at the combined body pressing position 41.

Operations of various drums and various transfer devices may be slightly different from those described above. For example, an order of the operations of various drums and/or various transfer devices may be an order in which the combined body 7 can be molded from the carcass band 1 and the belt band 6, and the green tire can be further molded by winding the sidewall rubber, and may be slightly different from the above-described order.

2. Second Embodiment

As illustrated in FIG. 16, a green tire manufacturing apparatus 110 according to a second embodiment includes the carcass band drum 11, the belt band drum 12, and the shaping drum 13, which serve as drums as in the first embodiment. However, different from the first embodiment, the green tire manufacturing apparatus 110 according to the second embodiment includes two shaping drums 13. The green tire manufacturing apparatus 110 according to the second embodiment does not include the sidewall drum 14 which is provided in the first embodiment.

The green tire manufacturing apparatus 110 includes, as in the first embodiment, the carcass band transfer 15, the belt band transfer 16, and the green tire transfer 17 as transfer devices for transferring various members.

In addition, the green tire manufacturing apparatus 110 includes two sidewall rubber supply devices 18 and two stitchers 19 as in the first embodiment. The two sidewall rubber supply devices 18 are placed on one supply device moving stage 128. The two stitchers 19 are placed on one stitcher moving stage 129.

Further, the green tire manufacturing apparatus 110 has first to fifth passages 121, 122, 123, 124, and 125 as passages through which the transfer devices move.

The first to fifth passages 121, 122, 123, 124, and 125 are linear passages. The first passage 121, the second passage 122, and the fourth passage 124 are disposed in parallel. The third passage 123 extends in a direction perpendicular to an extending direction of the first passage 121 and the like. The third passage 123 intersects the first passage 121 and the second passage 122.

A rotary stage 127 is provided as a transfer device between the second passage 122 and the fourth passage 124. The rotary stage 127 is used to exchange the shaping drum 13 on the second passage 122 for the shaping drum 13 on the fourth passage 124 as described later.

The fifth passage 125 extends in a direction perpendicular to the extending direction of the fourth passage 124. The fifth passage 125 intersects the fourth passage 124. The fifth passage 125 is parallel to the third passage 123.

Each of the first passage 121, the second passage 122, and the fourth passage 124 includes two parallel rails. The rails constituting the first passage 121, the second passage 122, and the fourth passage 124 are fixed on a predetermined stage that is in contact with a floor. On the other hand, the third passage 123 and the fifth passage 125 are disposed away from the floor and above the floor.

As in the first embodiment, drums or the like moves through the first to fifth passages 121, 122, 123, 124, and 125. Specifically, the carcass band drum 11 moves through the first passage 121. The belt band drum 12 moves through the second passage 122. The carcass band transfer 15 moves through the third passage 123. The green tire transfer 17 moves through the fifth passage 125.

One shaping drum 13 is on the second passage 122, and the other shaping drum 13 is on the fourth passage 124. Each of these shaping drums 13 is held by the shaping drum moving device 33. When the shaping drum moving devices 33 travel on the rails of the second passage 122 and the fourth passage 124, the shaping drums 13 move through the second passage 122 and the fourth passage 124.

Two shaping drum moving devices 33 may be simultaneously placed on the rotary stage 127. Positions of the two shaping drums 13 can be exchanged by rotating the rotary stage 127 by 180° in a state in which the two shaping drum moving devices 33 are placed. That is, the shaping drum 13 on the fourth passage 124 can be moved to the second passage 122 while the shaping drum 13 on the second passage 122 is moved to the fourth passage 124.

The stitcher moving stage 129 on which the two stitchers 19 are placed is disposed at a position facing a predetermined position of the second passage 122. Here, the predetermined position is a position at which the shaping drum 13 held by the shaping drum moving device 33 is present when the shaping drum moving device 33 is on the rotary stage 127.

The stitcher moving stage 129 is placed on rails 139 extending in a direction orthogonal to the extending direction of the second passage 122. The stitcher moving stage 129 can move close to or apart from the second passage 122 by moving on the rails 139. In FIG. 16, the stitchers 19 and the stitcher moving stage 129 when moving close to the second passage 122 are drawn by solid lines, and the stitchers 19 and the stitcher moving stage 129 when moving apart from the second passage 122 are drawn by broken lines.

In a state in which the stitcher moving stage 129 moves close to the second passage 122, the stitchers 19 press surfaces of the combined body 7 held by the shaping drum 13. At this time, a position at which the shaping drum 13 and the stitcher 19 are present is a combined body pressing position 141 that is a position for pressing the combined body 7. When the rotary stage 127 is rotated, the stitcher moving stage 129 moves apart from the second passage 122 not to be in contact with the shaping drum 13.

The supply device moving stage 128 on which the two sidewall rubber supply devices 18 are placed is disposed at a position facing a predetermined position of the fourth passage 124. Here, the predetermined position is a position at which the shaping drum 13 held by the shaping drum moving device 33 is present when the shaping drum moving device 33 is on the rotary stage 127.

The supply device moving stage 128 is placed on rails 138 extending in a direction orthogonal to the extending direction of the fourth passage 124. The supply device moving stage 128 can move close to or apart from the fourth passage 124 by moving on the rails 138. In FIG. 16, the sidewall rubber supply devices 18 and the supply device moving stage 128 when moving close to the fourth passage 124 are drawn by solid lines, and the sidewall rubber supply devices 18 and the supply device moving stage 128 when moving apart from the fourth passage 124 are drawn by broken lines.

In a state in which the supply device moving stage 128 moves close to the fourth passage 124, a sidewall rubber supplied from the sidewall rubber supply device 18 is wound around the combined body 7 held by the shaping drum 13. At this time, a position at which the shaping drum 13 and the sidewall rubber supply devices 18 are present is a sidewall molding position 140 at which the sidewall rubber is attached to the combined body 7. When the rotary stage 127 is rotated, the supply device moving stage 128 moves apart from the fourth passage 124 not to be in contact with the shaping drum 13.

Although not illustrated, the sidewall molding position 140 is provided with two stitchers which are pressing devices having a known structure. The stitchers press the sidewall rubber attached to the combined body 7 from above.

A position on one end side (right side in FIG. 16) of the first passage 121 is a carcass band drum standby position 142.

In the second passage 122, a position on an opposite side (right side in FIG. 16) of the rotary stage 127 is a belt band drum standby position 143. In the second passage 122, a belt band transfer standby position 144 is present between the third passage 123 and the belt band drum standby position 143.

The second passage 122 is also a combined body molding position 150 at which the combined body 7 is manufactured. At the combined body molding position 150, the carcass band 1 is held by the shaping drum 13, the belt band 6 is attached to the carcass band 1 to mold the combined body 7, and the surfaces of the combined body 7 are further pressed by the stitchers 19.

A position on one end side of the third passage 123 outward (upper side in FIG. 16) of the first passage 121 is a carcass band transfer standby position 148. An intersecting position between the third passage 123 and the first passage 121 is a carcass band delivery position 145. An intersecting position between the third passage 123 and the second passage 122 is a shaping drum delivery position 146 at which the carcass band 1 is delivered from the carcass band transfer 15 to the shaping drum 13.

An intersecting position between the fourth passage 124 and the fifth passage 125 is a green tire delivery position 147 at which a green tire is delivered from the shaping drum 13 to the green tire transfer 17. A position on one end side (lower side in FIG. 16) of the fifth passage 125 is a green tire transfer standby position 149.

At the above positions, the members are delivered as in the first embodiment. In the green tire manufacturing apparatus 110, one side (right side in FIG. 16) of the rotary stage 127 is a position at which the carcass band 1 and the belt band 6 stand by and the combined body 7 is pressed. The other side (left side in FIG. 16) of the rotary stage 127 is a position at which molding of the sidewall 8 and removal of the green tire are performed.

In the green tire manufacturing apparatus 110 having such a configuration, the same method as in the first embodiment can also be performed. Specifically, at the combined body molding position 150, the carcass band 1 is held by the shaping drum 13, and the belt band 6 is attached to an outer circumferential surface of the carcass band 1 substantially expanded into a tire shape to mold the combined body 7. Then, the stitchers 19 press the surfaces of the combined body 7 on the shaping drum 13. The pressing is performed in a state in which the shaping drum moving device 33 is placed on the rotary stage 127.

When the rotary stage 127 rotates, the combined body 7 for which the pressing is completed and the shaping drum 13 that holds the combined body 7 move from the combined body molding position 150 to the sidewall molding position 140. Then, at the sidewall molding position 140, the sidewall 8 is molded on the combined body 7, and the green tire is completed.

After the combined body 7 moves to the sidewall molding position 140, since the combined body molding position 150 is empty, the subsequent combined body 7 can be manufactured at the combined body molding position 150. Therefore, at least a part of molding steps of the sidewall 8 at the sidewall molding position 140 and at least a part of manufacturing steps of the combined body 7 at the combined body molding position 150 are performed in parallel.

Before the pressing of the combined body 7 at the combined body molding position 150 is completed, the molding of the carcass band 1 and the belt band 6 serving as bases of the combined body 7 to be molded next is completed. The carcass band 1 and the belt band 6 after being molded stand by on the green tire manufacturing apparatus 110.

In this manner, in the green tire manufacturing apparatus 110 according to the second embodiment, the same method as in the first embodiment can also be performed. With the implementation of the method, productivity of the green tire is improved.

In the second embodiment, the same changes as in the first embodiment can also be made.

REFERENCE SIGNS LIST

1: carcass band
1*a*: expanded portion
2: inner liner
3: rubber chafer
4: carcass ply
5: bead
6: belt band
7: combined body
7*a*: side surface
8: sidewall
10: green tire manufacturing apparatus
11: carcass band drum
12: belt band drum
13: shaping drum
13*a*: bead holding unit
14: sidewall drum
15: carcass band transfer
16: belt band transfer
17: green tire transfer
18: sidewall rubber supply device
19: stitcher
21: first passage
22: second passage
23: third passage
24: fourth passage
26: control unit
31: carcass band drum moving device
32: belt band drum moving device
33: shaping drum moving device
34: sidewall drum moving device
40: sidewall molding position
41: combined body pressing position
42: carcass band drum standby position

43: belt band drum standby position
44: belt band transfer standby position
45: carcass band delivery position
46: shaping drum delivery position
47: sidewall drum delivery position
48: carcass band transfer standby position
49: green tire transfer standby position
50: combined body molding position
110: green tire manufacturing apparatus
121: first passage
122: second passage
123: third passage
124: fourth passage
125: fifth passage
127: rotary stage
128: supply device moving stage
129: stitcher moving stage
138: rail
139: rail
140: sidewall molding position
141: combined body pressing position
142: carcass band drum standby position
143: belt band drum standby position
144: belt band transfer standby position
145: carcass band delivery position
146: shaping drum delivery position
147: green tire delivery position
148: carcass band transfer standby position
149: green tire transfer standby position
150: combined body molding position

What is claimed is:

1. A green tire manufacturing method in which a belt band is attached to a carcass band to form a combined body and a sidewall rubber is attached to the combined body to form a green tire, the green tire manufacturing method comprising:

using a green tire manufacturing apparatus having a combined body molding position and a sidewall molding position that are two different positions, and having rails with the combined body molding position, rails with the sidewall molding position and rails;

a combined body manufacturing step of holding the carcass band on a shaping drum at the combined body molding position, attaching the belt band to the carcass band on the same shaping drum to form the combined body, and pressing a surface of the combined body;

moving the combined body from the combined body molding position to the sidewall molding position along the rails which span the combined body molding position rails and the sidewall molding position rails by using a transfer device which holds the combined body;

a sidewall molding step of attaching the sidewall rubber to the combined body held by a sidewall drum which is a drum different from the shaping drum at the sidewall molding position;

a step of transferring the combined body from the shaping drum to the transfer device; and a step of transferring the combined body from the transfer device to the sidewall drum; wherein a plurality of the green tires are continuously molded; and at least a part of the sidewall molding step at the sidewall molding position and at least a part of the combined body manufacturing step at the combined body molding position are performed in parallel.

2. The green tire manufacturing method according to claim 1, wherein before the pressing of the combined body is completed, a carcass band and a belt band that are bases of a combined body to be molded next stand by on the green tire manufacturing apparatus.

3. The green tire manufacturing method according to claim 1, the method comprising the steps of:

transferring the green tire, with the sidewall rubber attached to the combined body, from the sidewall drum to the transfer device; and moving the green tire to a carry out position of the green tire on the rails by using the transfer device; wherein the attachment of the belt band to the carcass band is completed on the shaping drum before the green tire is carried out from the carry out position and the transfer device and the sidewall drum are empty.

\* \* \* \* \*